(12) United States Patent
Kreutz et al.

(10) Patent No.: US 11,679,798 B2
(45) Date of Patent: Jun. 20, 2023

(54) STEERING COLUMN FOR A MOTOR VEHICLE

(71) Applicants: thyssenkrupp Presta AG, Eschen (LI); thyssenkrupp AG, Essen (DE)

(72) Inventors: Daniel Kreutz, Feldkirch (AT); Andreas Willi, Lauterach (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 62 days.

(21) Appl. No.: 17/426,480

(22) PCT Filed: Feb. 3, 2020

(86) PCT No.: PCT/EP2020/052547
§ 371 (c)(1),
(2) Date: Jul. 28, 2021

(87) PCT Pub. No.: WO2020/161042
PCT Pub. Date: Aug. 13, 2020

(65) Prior Publication Data
US 2022/0161841 A1    May 26, 2022

(30) Foreign Application Priority Data
Feb. 4, 2019 (DE) ...................... 10 2019 201 390.2

(51) Int. Cl.
*B62D 1/181* (2006.01)
*B62D 1/183* (2006.01)

(52) U.S. Cl.
CPC ............. *B62D 1/181* (2013.01); *B62D 1/183* (2013.01)

(58) Field of Classification Search
CPC ......... B62D 1/181; B62D 1/183; B62D 1/185
See application file for complete search history.

(56) References Cited

U.S. PATENT DOCUMENTS

| 2005/0050979 | A1 | 3/2005 | Barcat |
| 2007/0176405 | A1 | 8/2007 | Barcat |
| (Continued) | | | |

FOREIGN PATENT DOCUMENTS

| CN | 108367771 A | 8/2018 |
| DE | 10 2004 010 805 A | 9/2005 |
| (Continued) | | |

OTHER PUBLICATIONS

English Translation of International Search Report issued in PCT/EP2020/052547, dated Apr. 23, 2020.

*Primary Examiner* — Drew J Brown
(74) *Attorney, Agent, or Firm* — thyssenkrupp North America, LLC

(57) ABSTRACT

A method can be used to adjust a steering column for a motor vehicle that includes a casing unit in which a steering spindle is mounted rotatably about a longitudinal axis and at least two casing tubes that are guided so as to be adjustable relative to one another by adjustment travel in a longitudinal direction of the longitudinal axis. Along the adjustment travel, the casing tubes are extended farther out of one another in an operating region than in a transitional region, and a motorized adjustment drive acting on the casing tubes is actuated electrically for the relative adjustment of the casing tubes at a predetermined adjustment speed. To allow optimized switching between the operating region and the stowage position, a first adjustment speed is set in the operating region and a second adjustment speed, which is higher than the first adjustment speed, is set in the transitional region.

20 Claims, 11 Drawing Sheets

(56) References Cited

U.S. PATENT DOCUMENTS

| | | |
|---|---|---|
| 2014/0352481 A1 | 12/2014 | Uesaka |
| 2018/0319419 A1 | 11/2018 | Kreutz et al. |
| 2019/0031224 A1 | 1/2019 | Huber |
| 2021/0291894 A1 * | 9/2021 | Rouleau ............. B62D 15/0215 |

FOREIGN PATENT DOCUMENTS

| | | | | |
|---|---|---|---|---|
| DE | 10 2016 202 465 A | | 8/2017 | |
| DE | 102019201390 A1 * | | 8/2020 | ............. B62D 1/181 |
| EP | 1 634 795 A | | 3/2006 | |
| EP | 2 808 225 A | | 12/2014 | |
| FR | 3114070 A1 * | | 3/2022 | |
| WO | WO-2008072711 A1 * | | 6/2008 | ............. B62D 1/181 |
| WO | 2017009125 A1 | | 1/2017 | |
| WO | 2017/140526 A | | 8/2017 | |
| WO | 2020/007723 A | | 1/2020 | |

\* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2020/052547, filed Feb. 3, 2020, which claims priority to German Patent Application No. DE 10 2019 201 390.2, filed Feb. 4, 2019, the entire contents of both of which are incorporated herein by reference.

FIELD

The present disclosure generally relates to steering columns, including methods for adjusting steering columns of motor vehicles.

BACKGROUND

A steering column for a motor vehicle comprises a steering shaft with a steering spindle, at the rear end of which in the direction of travel, facing the driver, a steering wheel is arranged for input of a steering command by the driver. The steering spindle is rotatably mounted in a casing unit, together with which it forms an actuating unit. The casing unit is held by a carrier unit attached to the vehicle body. Adjustable steering columns allow the setting of the steering wheel position relative to the vehicle body by an adjustment of the casing unit relative to the carrier unit. For length adjustment, it is known to design the steering column so as to be adjustable in the longitudinal direction, i.e. in the direction of the longitudinal axis, in order to adjust the distance from the driver's position. For height adjustment, the steering spindle can be adjusted transversely to the longitudinal axis in order to set the height position of the steering wheel.

In autonomously driving vehicles, in manual driving mode, for comfortable manual steering intervention at the driver's position, it is known to position the steering wheel in an operating position within an operating region, which is also referred to below as the operating or comfort region. In autonomous driving mode when there is no manual steering intervention, the steering column is retracted, i.e. longitudinally shortened, in order to bring the steering wheel into a stowage position outside the operating region, so that the vehicle interior is free for other use.

For length adjustment, a casing unit with a telescopic arrangement of casing tubes is known, as described for example in EP 2 808 225 A1. This comprises an outer casing tube supported on the body at the front in the direction of travel, in which an inner casing tube is telescopically encased in the axial direction. For length adjustment, a motorized adjustment drive is provided which acts on the casing tubes as a spindle drive acting in the axial direction. The steering column can be moved by means of the adjustment drive out of the stowage position, in which the casing tubes are retracted into one another as far as possible in the axial direction, into a driver's side end position in which the casing tubes are extended as far as possible out of one another. The maximum possible adjustment range between the stowage position and the end position defines the adjustment travel of the steering column.

Steering columns for autonomous driving mode are distinguished by a large adjustment travel so that the stowage position has a significant distance from the operating region, which extends only over a smaller part region of the adjustment travel from the maximally retracted, driver's side end position.

In manual driving mode, the steering column is set so that the steering wheel is situated in an individual operating position within an operating region. The operating region designates the adjustment region in which, in manual driving mode, ergonomically suitable operating positions can be set for input of steering commands. In the operating region, the casing tubes are extended relatively far out of one another. When the casing tubes are retracted further into one another, the transitional region adjoins the operating region; in this transitional region, no suitable and safe operating positions can be set since the vehicle driver cannot reach the steering wheel securely.

Within the operating region, a delicate and precise adjustment by means of the adjustment drive is required for setting the operating position. Therefore the adjustment drive is actuated so that adjustment takes place slowly and under control. As a result however, traversing the relatively long transitional region in order to reach the stowage position is correspondingly time-consuming.

Thus a need exists for an improved method for adjusting a steering column with a large adjustment travel, which allows an optimized switch between the operating region and the stowage position.

DETAILED DESCRIPTION

Figure 1:
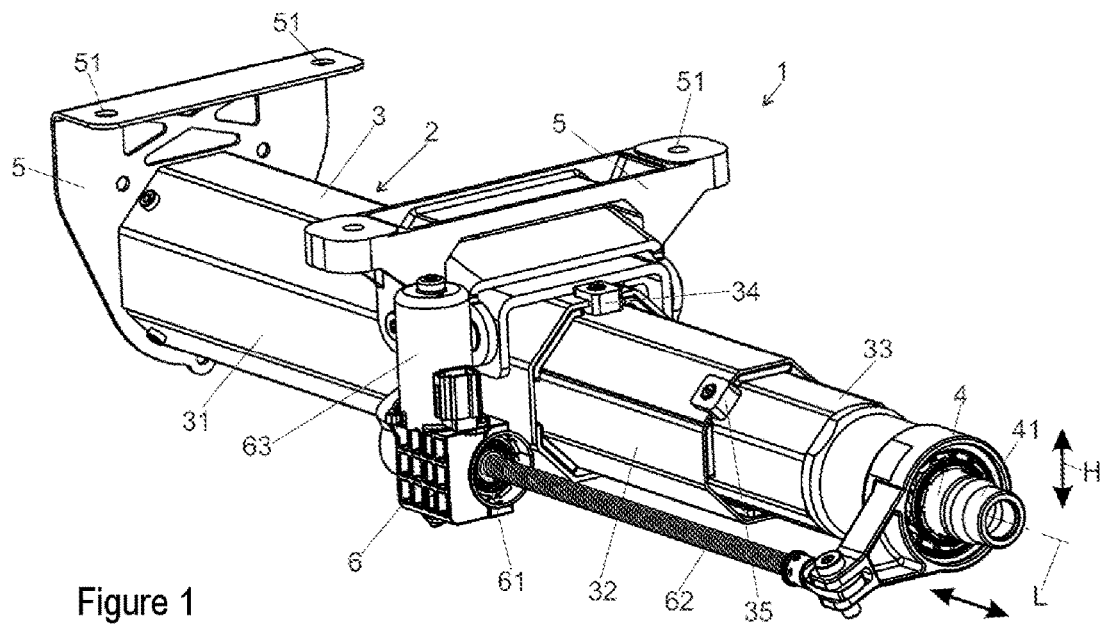
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure concerns methods for adjusting steering columns for motor vehicles. In some examples, a method may comprise a casing unit in which a steering spindle is mounted rotatably about a longitudinal axis and which has at least two casing tubes which are guided so as to be adjustable relative to one another by an adjustment travel in the longitudinal direction of the longitudinal axis, wherein, along the adjustment travel, the casing tubes are extended further out of one another in an operating region than in a transitional region, wherein a motorized adjustment drive acting on the casing tubes is actuated electrically for the relative adjustment of the casing tubes at a predetermined adjustment speed.

To adjust a steering column for a motor vehicle, comprising a casing unit in which a steering spindle is mounted rotatably about a longitudinal axis and which has at least two casing tubes which are guided so as to be adjustable relative to one another by an adjustment travel in the longitudinal direction of the longitudinal axis, wherein, along the adjustment travel, the casing tubes are extended further out of one another in an operating region than in a transitional region, wherein a motorized adjustment drive acting on the casing tubes is actuated electrically for the relative adjustment of the casing tubes at a predetermined adjustment speed, the method according to the invention provides that a first adjustment speed is set in the operating region and a second adjustment speed, which is higher than the first adjustment speed, is set in the transitional region.

In the operating region, which extends in a portion of the adjustment travel in the vicinity of the maximally extended end region and which is also referred to below as the operating or comfort region, it is not possible to input steering commands manually by turning the steering wheel. According to the method of the invention, the adjustment drive may be actuated within the defined operating region in order to move the casing tubes into one another relatively slowly with a first adjustment speed, also known as the adjusting or positioning speed, whereby a delicate, secure and precise length adjustment of the steering wheel is possible. The slow adjustment practically excludes risk of injury. Steering commands may be given in any operating position within the operating region, preferably also during an adjustment by the adjustment drive.

According to the invention, on switching between manual and autonomous driving modes, the casing tubes are moved relative to one another at least in portions with a higher adjustment speed in the transitional region, which is situated between the operating region and the stowage position in the maximally retracted state of the casing tubes, namely with the second adjustment speed which is higher than the first adjustment speed and may also be known as the stowing speed. During the transition from manual to autonomous driving mode, the adjustment within the operating region initially takes place with the first adjustment speed up to a retracted end of the operating region on the stowage side adjoining the transitional region. On transition to the transitional region, the higher second adjustment speed is activated so that the steering column can be retracted more quickly into the stowage position, wherein it comes to a stop in the stowage position so that the adjustment speed in the stowage position is zero. The particular advantage is that the steering wheel is initially moved slowly out of the operating region so there is no risk of injury, and only on entering the transitional region, where no further operation can be or is performed, does a fast stowage movement take place with higher adjustment speed. Thus the stowage process is accelerated.

During the transition from autonomous to manual driving mode, the adjustment out of the stowage position through the transitional region takes place with the higher second adjustment speed until the operating region is reached. Then the movement is slowed to the first adjustment speed, which allows a slower, safe and precise adjustment within the operating region, until the selected operating position is reached and adjustment is stopped. The advantage here is that the rapid adjustment takes place outside the operating region so that no accidental collision with the fast-moving steering wheel can occur.

Adjustment within the operating region preferably takes place via an actuating command from the vehicle driver, wherein this actuating command may be given by operation of a corresponding input means, e.g. a switch or button.

It may be provided that within the operating region, a steering and/or other actuation command can be input into the steering column even during adjustment with the first slow adjustment speed. In this way, in particular the reaction time for manual intervention on switching from autonomous to manual driving mode can be reduced, whereby safety may be increased.

It may be provided that within the transitional region, it is not possible to input a steering and/or other actuating command into the steering column. By deactivating the input possibility, on rapid adjustment the risk of accidental erroneous input and also the risk of injury may be minimized.

It may furthermore be provided that a transitional position, at which the transition takes place between the operating region and the transitional region, may be preset variably. This allows dynamic adjustment of the length of the operating region in which, according to the invention, a slower adjustment takes place, for example depending on the driving situation or whether the vehicle is operated in autonomous or manual driving mode. The transitional position which marks the boundary between different adjustment speeds may then be moved further forward or back.

In an advantageous embodiment, a stowage region is provided which extends in the longitudinal direction between the transitional region and the stowage position. With the method according to the invention, the relatively long transitional region can be traversed rapidly on switching between autonomous and manual mode, and the operating position can be set safely and comfortably.

The stowage region adjoins the transitional region and extends up to the stowage position. In this special case, the stowage region has an extent of virtually zero in the longitudinal direction so that the stowage region is the same as the stowage position.

It may be advantageous if a stowage region is provided in which the casing tubes are retracted further into one another than in the transitional region, wherein in the stowage region, a third adjustment speed is set which is lower than the second adjustment speed. Preferably, the third adjustment speed is higher than the first adjustment speed and lower than the second adjustment speed. In a partially extended stowage region, which is situated between the transitional region and the stowage position, there may be a slight risk of collision or seizing between the steering wheel and the instrument panel. In order to reduce this risk further, because the third adjustment speed is lower than the second adjustment speed, faster deceleration may take place and accidental contact can be detected in good time and avoided. Here, the third adjustment speed, which is higher than the first adjustment speed, allows a faster adjustment than in the operating region, whereby a rapid switch between autonomous and manual operation is still guaranteed.

It may be advantageous if the adjustment speed changes linearly. According to the invention, the adjustment speed changes at the transition between the first and second adjustment speeds and vice versa, and/or on a change to or from a third adjustment speed or vice versa. A linear change in adjustment speed corresponds to a constant acceleration, either positive or negative. Such a transition with a linear gradient can be achieved with little complexity.

An advantageous refinement may be that the adjustment speed changes non-linearly. Accordingly, at the transition from one adjustment speed to another, a progressive and/or degressive acceleration may be implemented, either positive or negative. It is also conceivable and possible initially to provide a progressive and then a degressive change, in order to achieve a particularly gentle speed transition between different adjustment speeds with low noise and low wear. For example, an exponential, logarithmic, sinusoidal or other curve profile may be predefined for the change in adjustment speed.

Preferably, the speed shown in a speed-travel diagram may be constantly differentiated over the entire curve. This allows a movement sequence which the vehicle driver perceives as pleasant during adjustment of the steering column.

It may be provided that the relative position of the casing tubes is detected by means of at least one position sensor, and the adjustment speed is set depending on the detected position. One or more position sensors, which may for example comprise magnetic, capacitative, inductive, optical or other suitable electrical sensor elements and an appropriate electronic analysis circuit, may establish the relative position of the individual casing tubes relative to one another and/or a position of the steering column and/or casing unit in the motor vehicle, specifically in the longitudinal and/or height direction. The detected position may be analyzed and the adjustment speed set as a function of the detected position. For example, by means of a position sensor, it may be detected that the end of the operating region has been reached and the change in adjustment speed made depending on the position or a parameter derived therefrom.

Alternatively or additionally, further sensors may be provided, for example proximity or contact sensors which are based on optical, acoustic, thermal, inductive, capacitative or other suitable measurement processes, and which detect operating states of the vehicle and/or the steering column, and the resulting measurement values may be used to control the adjustment speed. For example, by means of a proximity sensor, it may be detected whether obstacles are present in the movement path of the steering column during adjustment, and the adjustment speed may be reduced or stopped accordingly.

In a refinement of the method, it may be provided that the adjustment drive exerts a higher adjustment force at a lower adjustment speed than at a higher adjustment speed. The adjustment force is the force exerted by the adjustment drive in the adjustment direction on the casing tubes, which are displaceable telescopically in the longitudinal direction relative to one another. Because adjustment can take place relatively slowly with high adjustment force in the operating region, and in contrast relatively faster with lower adjustment force in the transitional region, the average power to be applied for adjustment remains substantially the same. In this way, the power of the adjustment drive may be adapted optimally to all operating states. The force or power correlates with the current intensity necessary in the regions during adjustment. Thanks to this design, the current intensity may be limited so that electrical lines of smaller cross-section may be provided.

In detail, with the design of the casing tube arrangement which is telescopic within the adjustment travel, part portions may be formed in which the adjustment force necessary for adjustment is reduced or increased. Here, the operating region constitutes a region of possible adjustment positions which may be set statically for at least some of the time as functional operating positions, for manual actuation during operation. In these operating positions in the operating region, a high stiffness and inherent frequency of the steering column are required. The stowage or transitional region defines an adjustment region outside the operating region which must be traversed within the adjustment travel in order to move the steering column into or out of the stowage position. In the transitional or stowage region, there are no defined operating positions, and the casing tubes are merely moved relative to one another for retraction or extension of the steering column.

Within the operating region, the casing tubes may be guided inside one another with low tolerances and little or no play, so that a high stiffness and inherent frequency of the casing unit is guaranteed, whereby a relatively higher adjustment force may be necessary which may be called the operating adjustment force. This may vary in the order of the adjustment force necessary over the entire adjustment travel in the prior art. In the transitional region, the requirements with respect to stiffness and inherent frequency are lower, and the telescopic guide according to the invention may be designed with easier movement, for example with greater play or reduced friction forces between the casing tubes. In this way, the adjustment force in a steering column according to the invention may be smaller in the transitional region, where it is also known as the transitional adjustment force, than the operating adjustment force.

In the method according to the invention, the adjustment drive may be actuated so that in the operating region, the first adjustment speed is provided with a higher first adjustment force, and in the transitional region the second adjustment speed is provided with a lower second adjustment force, which may be smaller than the first adjustment force.

The casing tubes are preferably arranged telescopically and guided in one another so that they can be retracted and extended telescopically for length adjustment of the steering column. In a two-piece telescopic arrangement, an inner casing tube is telescopically arranged in an outer casing tube. To form a three-piece or multipiece telescopic arrangement, one or more intermediate casing tubes may be arranged coaxially between the inner and outer casing tubes.

The adjustment drive may for example comprise a spindle drive in which a spindle nut and threaded spindle screwed therein can be driven by an electric motor so as to be rotatable by motorized drive relative to one another, causing a relative movement in the axial direction of the threaded spindle. The spindle nut and the threaded spindle act on the casing tubes, whereby these are movable axially relative to one another.

The axial direction or longitudinal direction is the direction of the longitudinal axis, wherein these terms are used synonymously.

In the operating region of the steering column, usually smaller adjustments are required, for example for fine setting of an individual steering wheel position, so that the adjustment can take place there with lower adjustment speed without disadvantage.

Preferably, the operating region extends in the direction of the longitudinal axis over at least 30 mm, particularly preferably at least 50 mm. Preferably, the operating region extends in the direction of the longitudinal axis over maximum 100 mm.

Preferably, the transitional region extends in the direction of the longitudinal axis, between the operating region and the stowage position or stowage region, over at least 30 mm, particularly preferably at least 50 mm, and quite particularly preferably at least 100 mm.

In order to achieve a predefined mean adjustment speed over the entire adjustment travel, an adjustment drive may be used which is dimensioned smaller than in the prior art. As a result, the weight and necessary installation space, energy consumption and control complexity may be reduced.

At least one first so-called comfort region, also known as the stowage region, may be provided in the region of maximally retracted casing tubes, and at least one second comfort region in the region of maximally extended casing tubes, wherein the operating region may be formed in or be identical with the second comfort region. The operating region is followed by a transitional region between the first and second comfort regions. In said first comfort region, which corresponds to the stowage region, the stowage position is situated in the end region; here, in autonomous driving mode, the steering column is held as securely as possible with little play and little vibration when the casing tubes are fully retracted. In the second comfort region with the operating region, the steering and transverse moments exerted must be safely supported by the casing unit, and a correspondingly high stiffness is required for the connection of the casing tubes. The transitional region is dynamically traversed only briefly on adjustment between the stowage and operating positions, wherein the requirements for stiffness and resonant frequency are lower than in the operating position.

It may be provided that a greater play between the casing tubes is provided in the transitional region than in the operating region. The radial play between the casing tubes determines the friction force on telescopic adjustment which must be overcome by the adjustment drive. In the operating region, a low-play or play-free linear fit may be achieved between the casing tubes, which ensures a high stiffness. In the transitional region, the linear fit may have a greater play, whereby the friction force acting in the axial direction on telescopic adjustment, and hence the necessary adjustment force, is reduced.

Alternatively, it is conceivable and possible to configure the mutually facing surfaces, which are moved relative to one another during telescopic adjustment, differently in the operating and stowage regions, so that different friction forces are generated, for example by means of different surface structures, materials, local elastic deformations or similar.

An embodiment of the invention may provide that an external casing tube, also called the outer casing tube, has an inner bearing portion which extends in the axial direction over part of the adjustment travel, and an inner guide portion which extends in the axial direction over part of the adjustment travel and has a larger internal cross-section than the inner bearing portion; also, an internal casing tube, also called the inner casing tube and received in the outer casing tube, has an outer bearing portion which extends in the axial direction over part of the adjustment travel, and an outer guide portion which extends in the axial direction over part of the adjustment travel and has a smaller outer cross-section than the outer bearing portion, wherein the outer bearing portion can be positioned in the inner bearing portion.

In the function as an outer casing tube, an inner casing tube is received in the inner cross-section so as to be telescopically displaceable in the axial direction. Accordingly, a two-piece telescope has only an outer and an inner casing tube, and in a multipiece telescope, an intermediate casing tube inserted in-between functions simultaneously as an outer and inner casing tube.

When an outer and an inner casing tube are telescopically moved relative to one another by retraction or extension, the inner and outer bearing and guide portions are moved relative to one another in the axial direction and brought into coaxial arrangement, depending on the relative adjustment state of the casing tubes. Here in principle, two states may occur, one of which defines the comfort region, e.g. the operating region in which the outer bearing portion is situated at least partially in the inner bearing portion, and the other of which defines the transitional region in which the outer and inner bearing portions have a spacing in the axial direction, i.e. the bearing portions of the one casing tube are situated in the region of the guide portions of the respective other casing tube.

With respect to form and dimensions, the outer and inner bearing portions are adapted to one another so as to give a low-play or play-free linear fit in the axial direction, wherein the bearing play transversely to the longitudinal axis is correspondingly small. In the resulting operating region, a linear bearing is created with a high stiffness and inherent frequency of the casing tube arrangement, in which the necessary adjustment force, described above an operating adjustment force or comfort adjustment force, is correspondingly high.

If the casing tubes are moved out of the operating region by relative adjustment so that the bearing portions are separated from one another in the axial direction, the inner casing tube with its outer bearing portion is situated in the inner guide portion of the outer casing tube, and with its outer guide portion in the inner bearing portion of the outer casing tube. As a result, the casing tubes are in a transitional region in which they are guided linearly for length adjustment, wherein a greater play—namely the so-called guide play—exists between the mutually coaxially arranged bearing and guide portions than between the bearing portions in the comfort region. As a result, the necessary adjustment force in the transitional region, known as the transitional adjustment force, is lower than the operating adjustment force.

The axially alternating design of the bearing and guide portions means that during adjustment along an adjustment travel, the casing tube arrangement can automatically be brought into a comfort or transitional region depending on the respective adjustment state. The outermost casing tube of a telescopic arrangement has only inner bearing and guide portions, the innermost casing tube of a telescopic arrangement has only outer bearing and guide portions, and an intermediate casing tube arranged in-between in a multipiece telescope has both inner and outer bearing and guide portions.

Preferably, a casing tube has an inner and/or outer bearing portion in both its end portions, between which an inner and/or outer guide portion respectively extends. This arrangement means that when the casing tubes are maximally retracted or extended, comfort regions are created in the end regions, for example in the extended end region of the operating region. This configuration corresponds to the requirements explained above for a steering column for autonomous driving in which, in the stowage position, the casing tubes are maximally retracted into one another, and the operating region is situated in the end region of maximal extension. In the stowage position, the bearing portions of both end regions are arranged coaxially in one another. In the operating region, the front bearing portion with respect to the direction of travel of the driver's side rear casing tube is in the above-described low-play bearing engagement with the rear bearing portion of the front vehicle-side casing tube. One advantage of this design is that, by adjustment of the steering column by means of the adjustment drive, the comfort and transitional regions are mechanically automatically included in the region of the stowage position and the operating region respectively.

It may be provided that on a casing tube, a bearing element is formed which protrudes into the cross-section between the casing tubes. A bearing element may be arranged in the inner cross-section of a casing tube and have a smaller inner cross-section than the casing tube, whereby it forms an inner bearing portion. If a bearing element which has a larger outer cross-section than the casing tube is arranged externally on the casing tube, it may form an outer bearing portion. As explained above, a comfort region may be set in that the bearing portions formed by the bearing elements are brought into alignment in the axial direction, and a transitional region may be set by axial spacing of the bearing elements.

The bearing element may have a slide element, preferably a sliding sleeve, which is fixedly connected in the axial direction to a casing tube. A sliding sleeve which is continuous over the circumference in cross-section, or also one or more slide elements distributed as segments over the circumference, may serve as an outer sliding sleeve and be arranged on the outside of the inner casing tube or as an inner sliding sleeve on the inside of an outer casing tube in order to form a bearing portion. Mutually corresponding inner and outer sliding sleeves are adapted to one another such that an inner sliding sleeve can slide in a sliding sleeve in the axial direction with little or no play. The sliding sleeve may be formed as a tube portion and be adapted to the cross-section of the casing tubes which may have a round, non-round or polygonal, e.g. quadrangular, hexagonal or octagonal cross-section. Alternatively, the sliding sleeve, preferably made from plastic, may be molded directly onto the corresponding casing tube, for example by plastic injection-molding.

The slide elements may be designed to reduce friction, e.g. by a slide coating on the surface, or by being formed from an easily sliding material such as plastics, e.g. PTFE (polytetrafluoroethylene), or a nonferrous or bearing metal. In this way, the slide elements in the comfort region may have a relatively easily adjustable telescopic mounting despite the low play. Outside the comfort region, the slide elements in a guide portion may have a radial guide play from the inner and outer casing surfaces of the casing tubes, which is greater than the bearing play between the slide elements in the comfort region.

It may be provided that the bearing element has at least one roller body which is mounted in a casing tube so as to be rotatable about a roller axis. In a bearing portion, one or preferably more roller bodies, for example rollers, needle rollers or similar, may be mounted in a casing tube so as to be rotatable about a respective roller axis lying transversely to the longitudinal axis and fixed in the axial direction relative to the casing tube. The roller body of the one casing tube protrudes radially inward or outward, and is dimensioned so that it can roll on another casing tube on the outside in the axial direction or on the inside in the axial direction. For example, outwardly protruding rollers may be mounted in the outer bearing portion of an inner casing tube and can roll with little or no play in the comfort region, which corresponds to the operating region and/or stowage region, on the inside in a bearing portion of an outer casing tube, and can be moved with play in the transitional region through a guide region of the outer casing tube of larger cross-section. This forms a linear roller bearing which creates a higher stiffness in the comfort region and can move easily through the transitional region.

Preferably, the roller bodies are arranged in one or more axially parallel first rows. The rows may be arranged on a casing tube so as to be distributed, preferably evenly, in the circumferential direction. If three or more casing tubes are arranged in one another in a multiple telescopic arrangement, it is advantageous that the roller bodies are arranged offset to one another, on a gap in the circumferential direction, between coaxially adjacent casing tubes.

It is possible that the steering spindle is coupled to a feedback actuator. A feedback actuator, in a mechanically decoupled steer-by-wire steering system, serves to give the driver a haptic feedback via the steering wheel depending on the driving situation, so as to provide a steering sensation similar to that of a conventional mechanically coupled steering system. For this, a feedback actuator has an actuator unit which comprises an actuator drive serving as a hand-moment or steering wheel actuator, which depending on a feedback signal couples a feedback moment corresponding to a real reaction moment into the steering wheel via the steering shaft. Such "force feedback" systems give the driver the impression of a real driving situation as in a conventional steering system, which facilitates intuitive reaction.

The casing unit with the steering spindle mounted therein forms an actuator unit. The casing unit may be held on a carrier unit which can be connected to a vehicle body, and be mounted so as to be pivotable in height about a pivot axis lying transversely to the longitudinal axis. A pivoting about this horizontal pivot axis allows a height adjustment, wherein the height of the steering wheel arranged on the rear end of the steering spindle can be adjusted relative to the driver's position.

The height adjustment may take place manually. In particular for automated stowage of the steering column in autonomous driving, it is advantageous that a motorized height adjustment drive is arranged between the casing unit and a carrier unit which may be arranged on the body of the motor vehicle, wherein said adjustment drive is electrically actuatable for relative height adjustment of the casing unit transversely to the longitudinal axis with a predefined height adjustment speed. The height adjustment drive may be structured in principle in the same manner as the above-described adjustment drive for length adjustment, for example as a spindle drive that can be driven by an electric motor. At least one height adjustment speed may be set, or a first height adjustment speed and a second height adjustment speed which is higher than or lower than a first height adjustment speed.

Preferably, according to the method of the invention, the height adjustment takes place depending on the adjustment in the length direction. It is advantageous if the height adjustment takes place at least partially simultaneously with the length adjustment in the direction of the longitudinal axis. By simultaneous superposed adjustment in the length and height direction, the stowage position, which is defined by a preset height adjustment with maximally retracted length adjustment, can be reached and left more quickly on a switch between autonomous and manual driving modes.

In conjunction with the method according to the invention, it is advantageous if the height adjustment takes place mainly in the stowage region. In the operating region, in automated stowage, preferably only an adjustment in the length direction is carried out with the first lower adjustment speed. The steering wheel thus initially only moves slowly in the longitudinal direction within the operating region. As soon as the operating region has been left and the transitional region then reached, the accelerated length adjustment takes place with the second adjustment speed, and preferably the height adjustment takes place in association therewith and at least partially simultaneously. This gives the advantage of a fast combined length and height adjustment ,which can be carried out largely without risk of collision outside the operating region until the stowage position is reached. Conversely, for switching between the stowage and operating positions, the steering column can be adjusted from the stowage position into the operating position in a combined fast length and height adjustment, in order then in the operating region to be adjusted initially only in the longitudinal direction with the slower second adjustment speed until the selected operating position is reached.

FIG. 1 shows, in an oblique view from the rear with respect to the direction of travel, a steering column 1 having an actuator unit 2. The actuator unit 2 comprises a casing unit 3 which has an outer casing tube 31, an intermediate casing tube 32 and an inner casing tube 33. The casing tubes 31, 32 and 33 are arranged so as to be telescopically displaceable coaxially in one another in the longitudinal direction, which corresponds to the axial direction of the longitudinal axis L, as indicated with a double arrow.

A steering spindle 4 is mounted in the casing unit 3 so as to be rotatable about the longitudinal axis L, and at its rear end has a connecting portion 41 for attachment of a steering wheel (not shown).

The casing unit 3 is held in a two-part carrier unit 5, which has fixing means 51 for attachment to a vehicle body (not shown).

An adjustment drive 6 for length adjustment, also called a length adjustment drive, has a spindle drive with a spindle nut 61 and a threaded spindle 62 screwed therein which can be driven in rotation with respect to one another by an electric motor 63. The threaded spindle 62 extends parallel to the longitudinal axis L and is connected to the inner casing tube 33, and the spindle nut 61 is supported via the adjustment drive 6 on the outer casing tube 31 in the length direction, which corresponds to the axial direction of the longitudinal axis L, wherein the outer casing tube 31 has a fork portion, and wherein the adjustment drive 6 is coupled to the fork portion via the interposition of a damping rubber element 666 formed as a silent bush. A relative rotation by means of the motor 63 causes the threaded spindle 62 and spindle nut 61 to move towards each other or away from one another, depending on the direction of rotation, whereby the inner casing tube 33 is retracted into or extended out of the outer casing tube 31 in the axial direction, as indicated by the double arrow. This causes a length adjustment, by means of which a steering wheel arranged at the connection portion 41 can be moved forward—to the left in the depiction of FIG. 1—into a stowage position, in which the inner casing tube 33 and intermediate casing tube 32 are retracted into the outer casing tube 31, i.e. compressed towards the front, or into an operating position in the operating region in which the casing tubes 31, 32 and 33 are extended out of one another.

Alternatively, the spindle nut 61 may rest on the inner casing tube 33, and the threaded spindle 62 on the outer casing tube 31.

Figure 2:
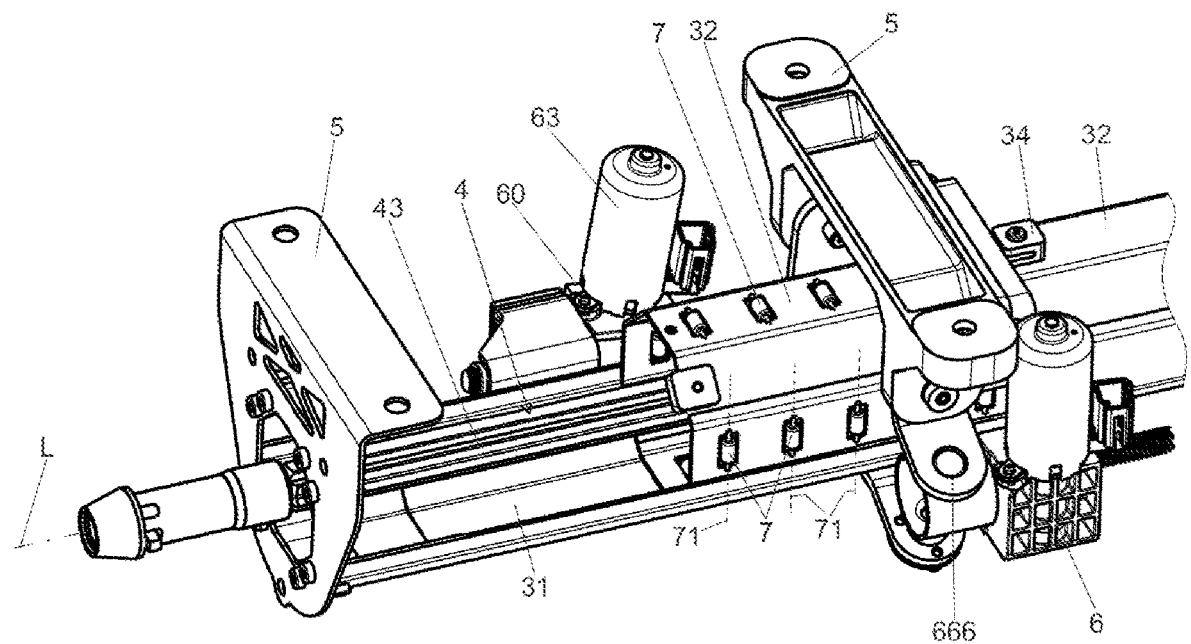
FIG. 2 is a schematic, partially-opened internal view of the steering column from FIG. 1.
Figure 3:
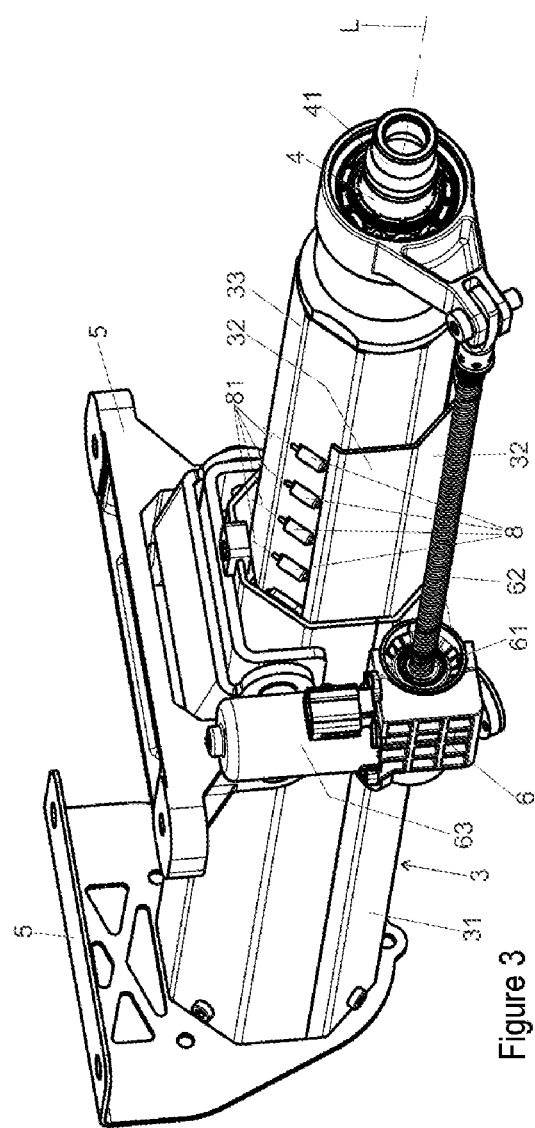
FIG. 3 is another schematic, partially-opened internal view of the steering column from FIG. 1.

FIG. 2 shows, in a perspective view from the front, the cut-away outer casing tube 31 which has been partially omitted to give a view of the intermediate casing tube 32. FIG. 3, in a view similar to FIG. 1, shows the cut-away intermediate casing tube 32.

Figure 4:
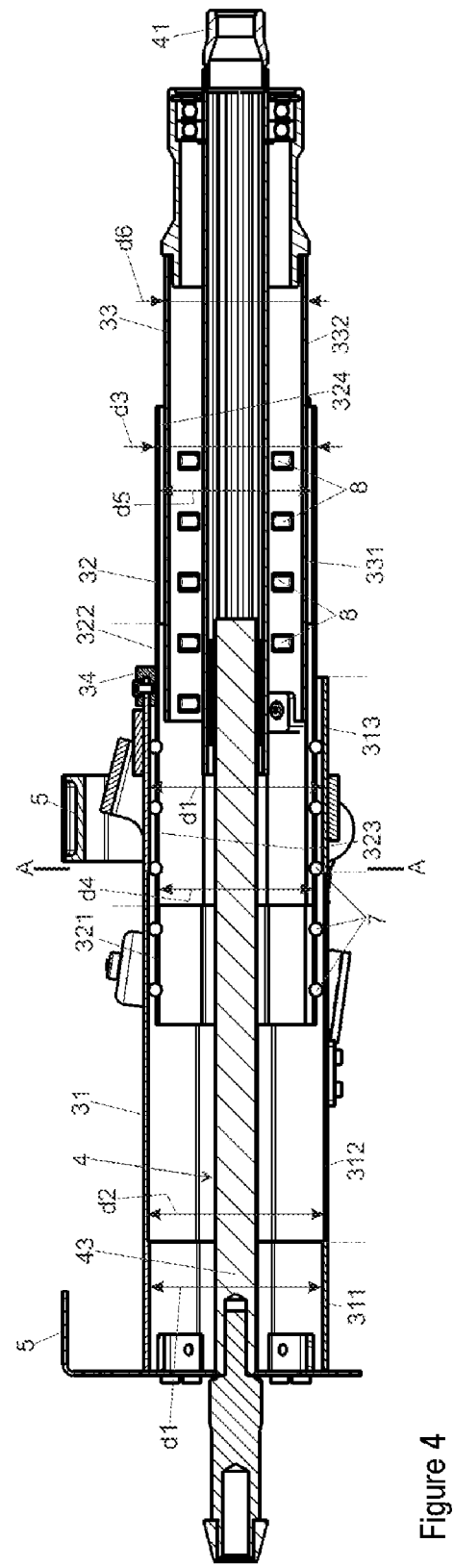
FIG. 4 is a longitudinal sectional view through the steering column from FIG. 1.
Figure 5:
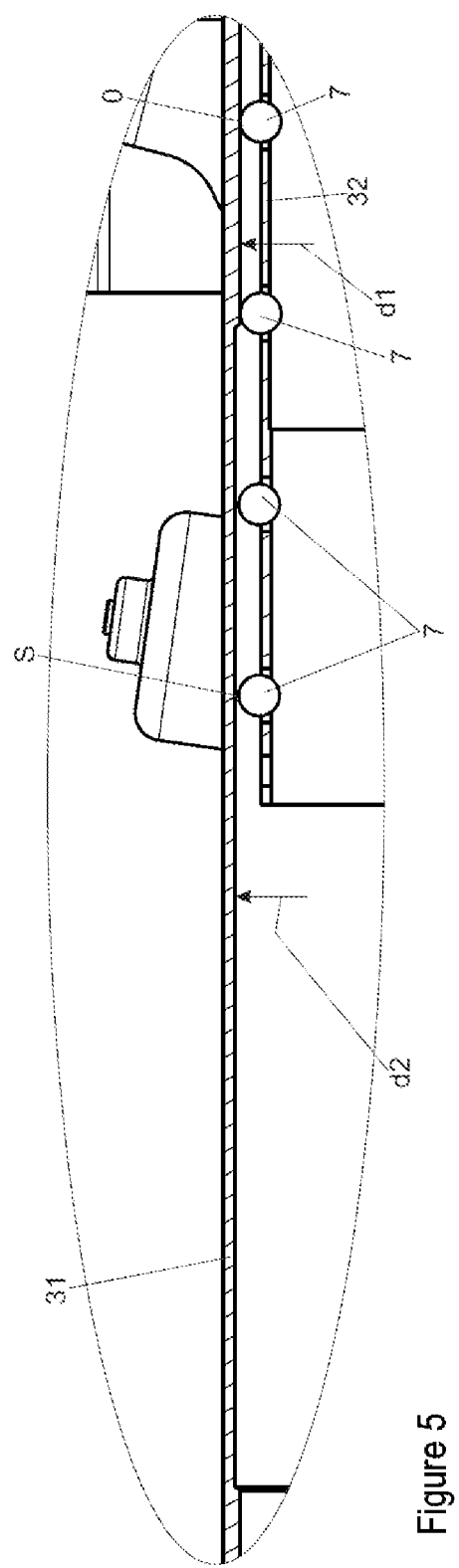
FIG. 5 is an enlarged detail view of FIG. 4.
Figure 6:
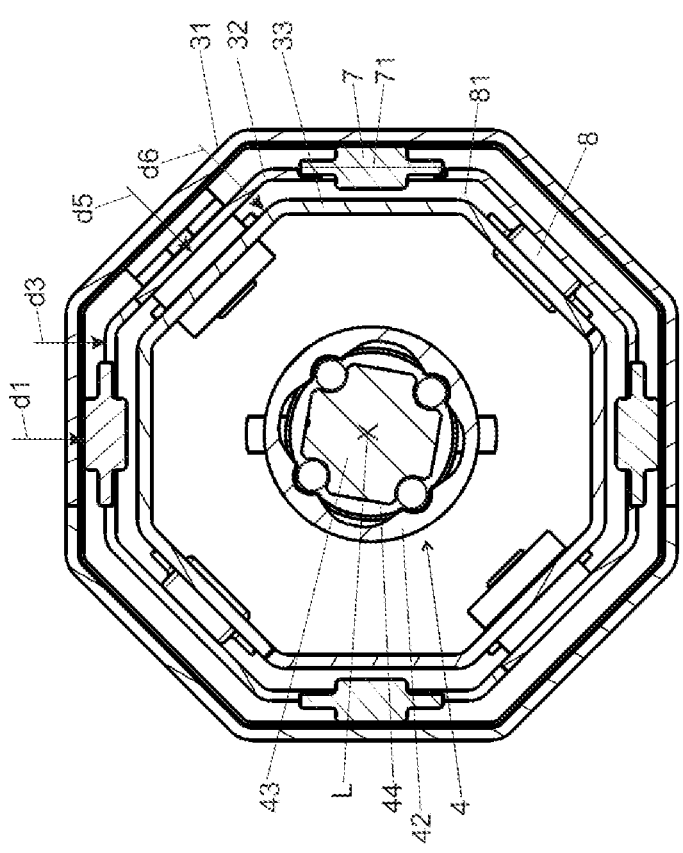
FIG. 6 a cross-sectional view taken across line A—A through the steering column from FIG. 4.
Figure 7:
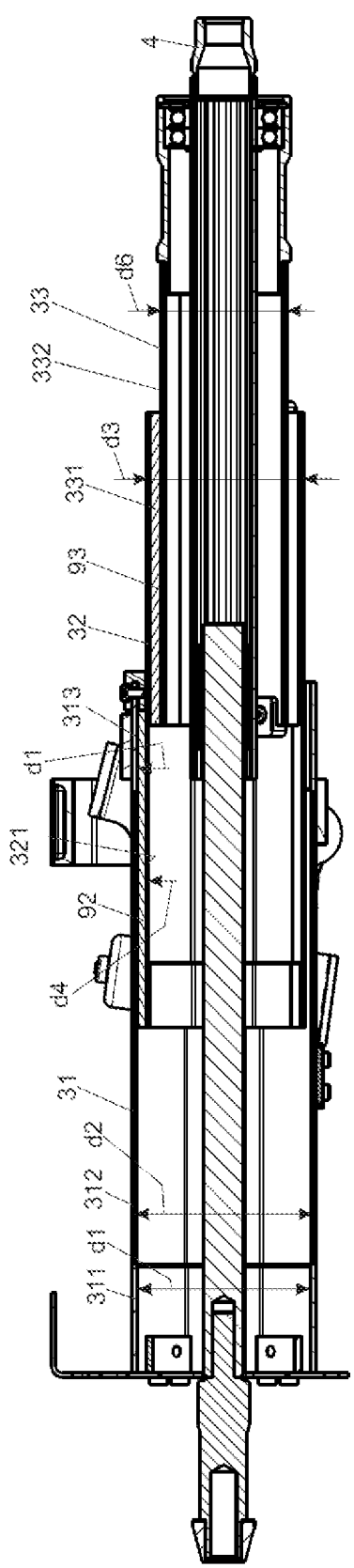
FIG. 7 is a longitudinal sectional view through a second embodiment of a steering column.

FIG. 4 shows a longitudinal section along the longitudinal axis L, and FIG. 5 a detailed view thereof. FIG. 6 shows a cross-section A-A according to FIG. 4.

The casing tubes 31, 32 and 33 have an octagonal profile cross-section, as evident from FIG. 6 which shows a cross-section A-A from FIG. 4 through the casing unit 3 in partially extended state, in which the inner casing tube 33 and the intermediate casing tube 32 are partially retracted into the outer casing tube 31. It is clear that the first rollers 7 are arranged between the outer casing tube 31 and the intermediate casing tube 32, and the second rollers 8 between the intermediate casing tube 32 and the inner casing tube 33. The rollers 7 or 8 are here each mounted in the casing tubes 32 and 33 so as to be rotatable about their respective roller axes 71 and 81 lying transversely to the longitudinal axis L. The rollers 7 protrude radially outward from the outer cross-section of the intermediate casing tube 32, so that they can roll on the inside of the outer casing tube 31 in the axial direction, and similarly the rollers 8 protrude from the outer cross-section of the inner casing tube 33 so they can roll on the inside of the intermediate casing tube 32 in the axial direction. The rollers 7 and 8 are arranged in rows each of five rollers 7, 8 in the axial direction on every second side of the octagonal profile of the casing tubes 32, 33, with an angular offset α of 360°/8=45°, offset on gaps in the circumferential direction, between the intermediate casing tube 32 and the inner casing tube 33, as evident from the cross-section shown in FIG. 6.

In the region of its front body-side end, the outer casing tube 31 has a first inner bearing portion 311 with an internal width dl and, adjoining this in the axial direction towards the rear, a guide portion 312 with a greater internal width d2, i.e. d1<d2; the latter is followed in the axial direction towards the rear by a second inner bearing portion 313 with an internal width dl of the first bearing portion 311. The respective internal width is the inner distance between two parallel opposing flat portions of the octagonal profile cross-section, wherein the rollers 7 roll on these flat portions. If casing tubes 31, 32, 33 with circular cylindrical cross-sections are used, the inner width of the respective portion is identical to the inner diameter of the respective portion.

The axial region of the total of five rollers 7 forms an outer bearing portion 321 on the intermediate casing tube 32, which has an outer width dl measured on the outside over the protruding rollers 7 and is thus identical to the inner width dl of the inner bearing portions 311 and 313. In this way, the rollers 7 can roll without play in the bearing portions 311 and 313. In the axial direction towards the rear, the outer bearing portion 321 is followed by an outer guide portion 322 with a smaller outer width d3, wherein d3<d1.

In the front end region, the intermediate casing tube 32 has an inner guide portion 323 with an inner width d4, which is followed in the axial direction towards the rear by an inner bearing portion 324 with a smaller inner width d5, i.e. d4>d5.

In a similar fashion to the intermediate casing tube 32, the inner casing tube 33 has an outer bearing portion 331 which is formed by the row of a total of five rollers 8, and has an outer width d5 measured over the outwardly protruding rollers 8 which thus corresponds to the inner width d5 of the inner bearing portion 324 of the intermediate casing tube 32, so that the rollers 8 can roll without play. In the axial direction towards the rear, the outer bearing portion 331 is followed by an outer guide portion 332 with a smaller outer width d6, wherein d6<d5.

The rollers 7 of the outer bearing portion 321 may roll without play, with zero play (=0), in the axial direction on the inside in the inner bearing portions 311 and 313 during a relative adjustment of the casing tubes 31 and 32. Thus the telescopic connection is supported play-free with high stiffness, and in the sense of the invention an adjustment takes place in the comfort region. If the casing tubes 31 and 32 are moved relative to one another in the longitudinal direction for retraction or extension, the rollers 7 in the guide region 312 have a radial play S of the size of the difference (d2−d1) from the inside of the outer casing tube 31. This is shown enlarged in the detail depiction of FIG. 5.

The inner casing tube 33 is mounted in the intermediate casing tube 32 in a similar fashion. The rollers 8 of the outer bearing portion 331 can roll play-free, with play=0, in the axial direction on the inside in the inner bearing portion 324 during relative adjustment of the casing tubes 32 and 33. Thus the telescopic connection is supported play-free with high stiffness, and in the sense of the invention an adjustment takes place in the comfort region. If the casing tubes 32 and 33 are moved relative to one another in the longitudinal direction for retraction or extension, the rollers 8 in the guide region 323 have a radial play S of the size of the difference (d4−d5) from the inside of the intermediate casing tube 32. This is shown enlarged in the detail depiction of FIG. 5 with the reference signs in brackets.

The total adjustment travel of the steering column 1 corresponds to the sum of the adjustment travels in the comfort regions and in the transitional region. Because of the greater play S, for adjustment in the axial direction, a smaller friction force must be overcome in the transitional region than in the comfort regions in the operating region and in the region of the stowage position, or the stowage region. The adjustment drive 6 must have a higher adjustment force, the operating adjustment force, for adjustment in the operating region than in the transitional region, where only a small stowage adjustment force need be applied. At the rear end of the outer casing tube 31, a stop 34 is arranged which protrudes inwardly at the open end into the intermediate space between the outer casing tube 31 and the intermediate casing tube 32. On extension, the rollers 7 of the intermediate casing tube 32 in the outer bearing portion hit against the stop 34 in the axial direction, providing security against separation from the outer casing tube 31. At the rear end of the intermediate casing tube 32, a stop 35 is arranged which protrudes inwardly into the intermediate space between the intermediate casing tube 32 and the inner casing tube 33, and secures the inner casing tube 33 against coming out of the intermediate casing tube 32 in that the rollers 7 meet the stop in the axial direction.

The steering spindle 4 is also designed telescopic with an inner shaft 43 which is telescopic in the longitudinal direction and engages by form fit in an outer shaft 42, wherein a guide sleeve 44 is arranged in-between to ensure an easy slide guidance. Alternatively, a linear roller bearing guide may be provided between the inner shaft 43 and the outer shaft 42.

FIGS. 7 to 12 show a further embodiment of the invention which has tubular sliding sleeves 92 and 93 instead of the rollers 7, 8. The sliding sleeve 92 is attached to the rear of the intermediate casing tube 32 so as to form an outer bearing portion 321, wherein it has an outer width of substantially dl and its length in the axial direction corresponds approximately to the length of the row formed by the five rollers 7 on the intermediate casing tube 32 in the first embodiment. Correspondingly, a further sliding sleeve 93 is attached to the rear of the inner casing tube 33 in order to form an outer bearing portion 331, wherein it has an outer diameter of approximately d5 and its length in the axial direction corresponds to the row formed by the five rollers 7 on the intermediate casing tube 32 in the first embodiment.

Figure 8:
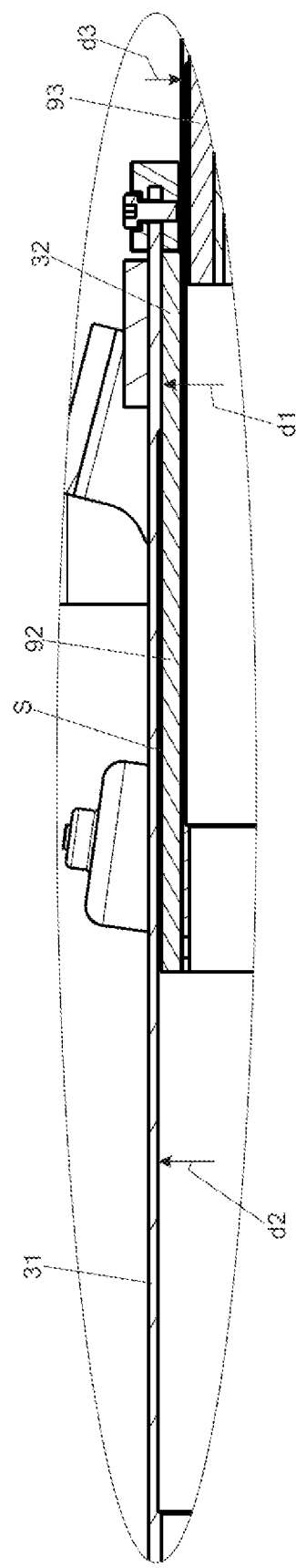
FIG. 8 is an enlarged detail view taken from FIG. 7.

In the enlarged detail depiction of FIG. 8 which corresponds in content to FIG. 5 of the first embodiment, the arrangement of the sliding sleeves 92 can be seen, wherein the arrangement is similar between the casing tubes 32 and 33.

Figure 9:
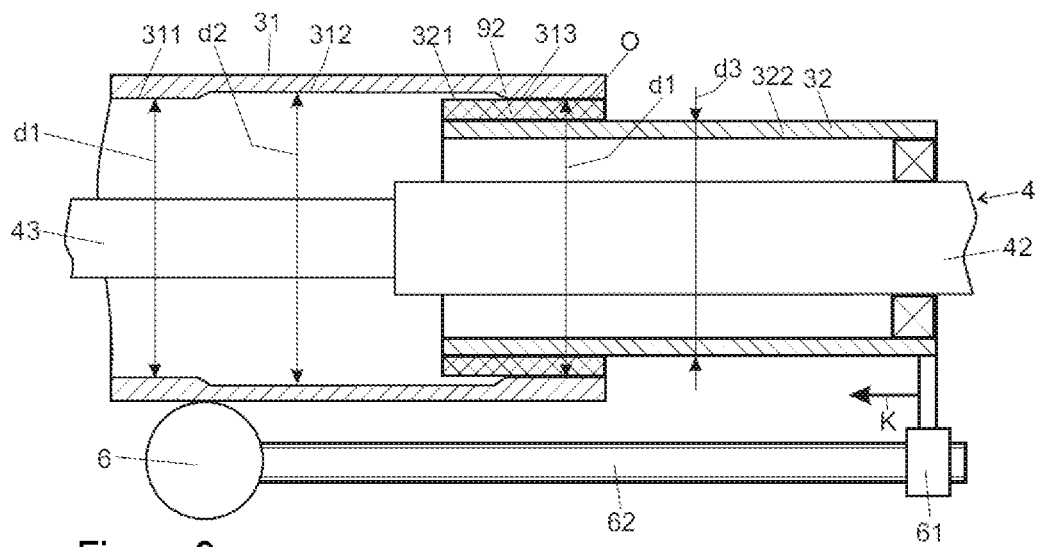
FIG. 9 is a schematic detail view taken from FIG. 7 showing the steering column in a first comfort region in an operating region.

FIG. 9 shows schematically a steering column with circular cylindrical casing tubes 31, 32 in a comfort region in the extended state which corresponds to the operating region. The sliding sleeve 92, as an outer bearing portion 321 with the outer diameter dl formed as an outer width, is mounted with low play or zero play in the inner bearing portion 311 of the outer casing tube 31. The adjustment drive 6 allows a relative adjustment in the axial direction for fine setting of the steering wheel position, wherein the comfort adjustment force K is to be applied.

Figure 10:
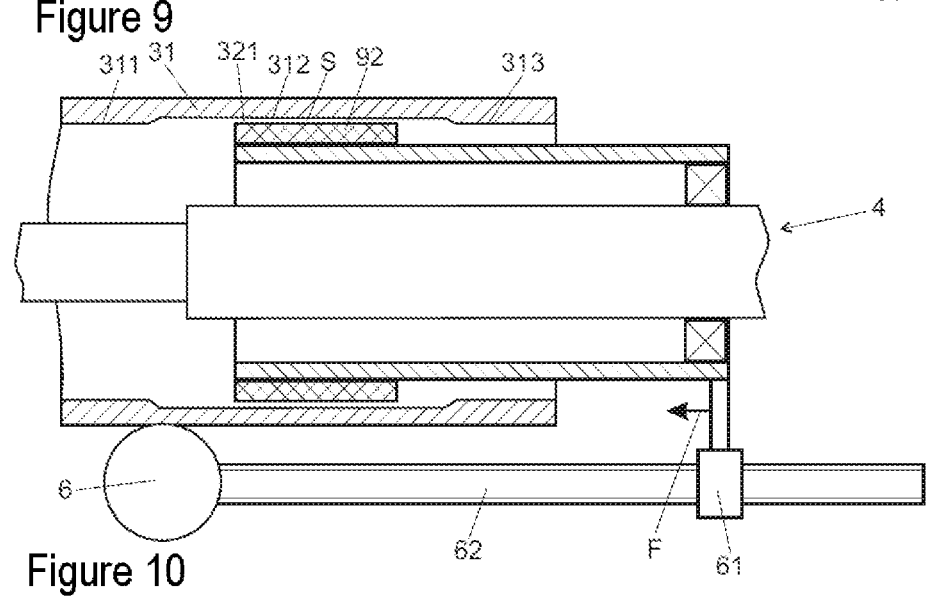
FIG. 10 is a schematic detail view taken from FIG. 7 showing the steering column in a transitional region.

FIG. 10 shows a steering column in a transitional region in which the casing tube 32 is retracted forward, to the left in the drawing, out of the operating region. The sliding sleeve 92 and hence the outer bearing portion 321 has a distance in the axial direction from the inner bearing portion 313, and is situated in the inner guide portion 312 where it has a play S=(d2−d1) from the inner wall of the outer casing tube 31. Because the friction force is reduced by the play S, for retraction only a transitional adjustment force F is required which is smaller than the operating adjustment force K (equal to the comfort adjustment force) as indicated by the force arrow. F<K.

Figure 11:
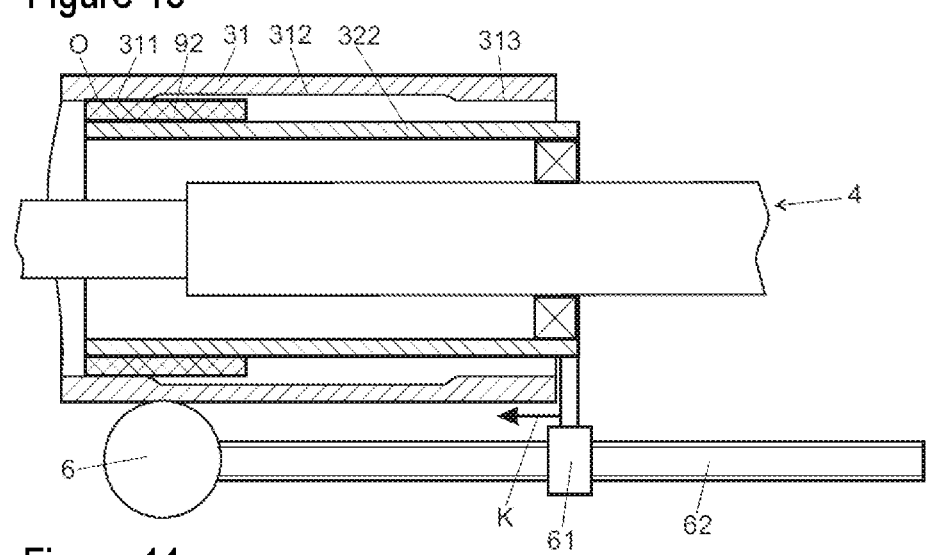
FIG. 11 is a schematic detail view taken from FIG. 7 showing the steering column in a first comfort region/ stowage region in a stowage position.

As soon as, on further retraction out of the guide portion 312, the sliding sleeve 93 enters the inner bearing portion 311 out of the guide portion 312 as shown in FIG. 11, the comfort region (stowage region) of the stowage position is reached. Here again, a play-free mounting takes place, as in the bearing portion 313. Because the bearing portions 311 and 313 in the example have the same inner diameter d1, for adjustment here again the comfort adjustment force K is required. It is also conceivable and possible that the inner bearing portion 311 has a smaller or larger inner diameter in order to predefine the comfort adjustment force K as larger or smaller.

Figure 12:
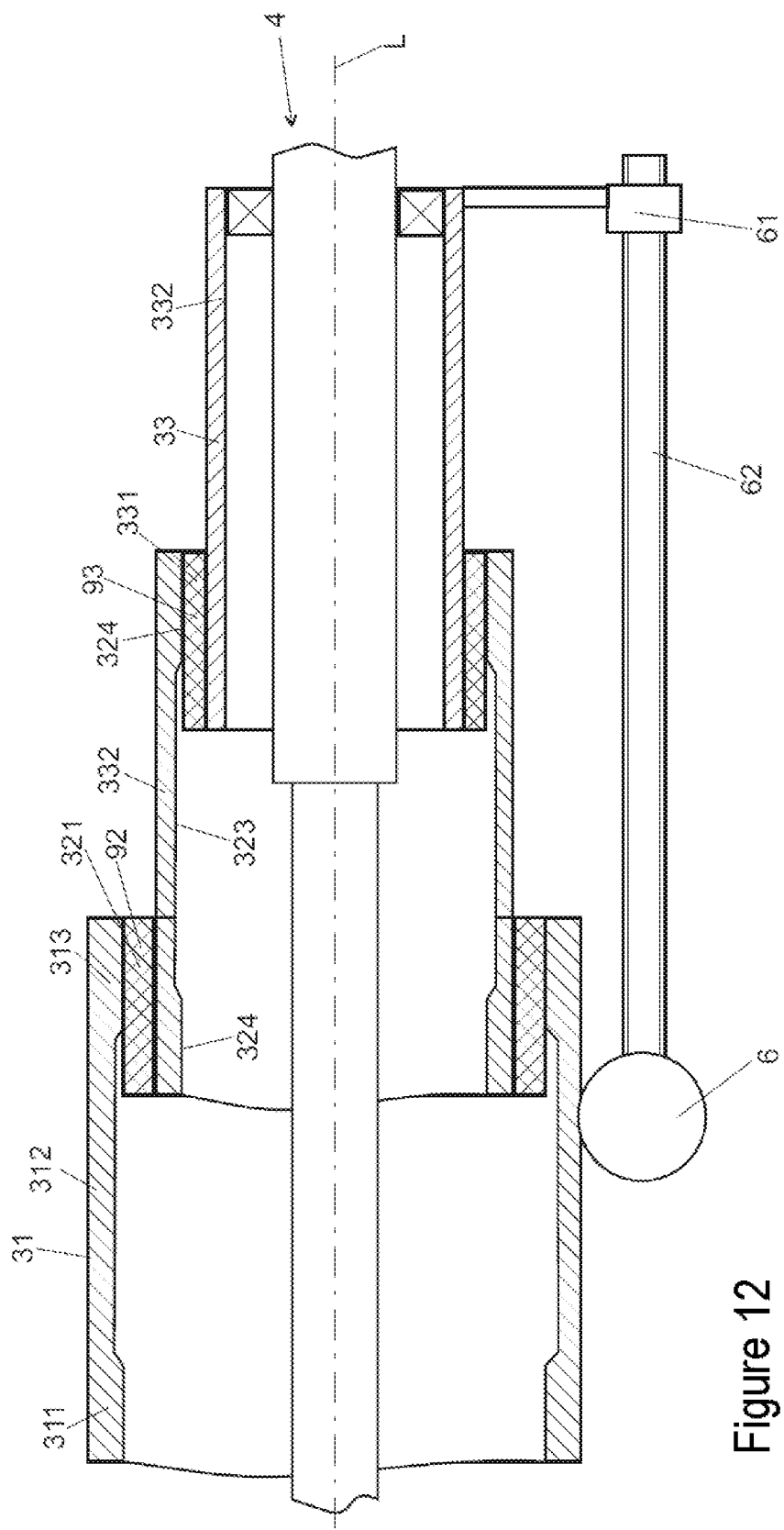
FIG. 12 is another schematic sectional view of the steering column from FIG. 7.

FIG. 12 shows schematically a multiple telescopic arrangement with the casing tubes 31, 32 and 33, and the sliding sleeves 92 and 93 which cooperate in the similar fashion to that shown in FIGS. 9 to 11.

The total adjustment travel of the steering column 1 comprises the adjustment positions in the comfort regions according to FIGS. 9 and 11, and in the transitional region according to FIG. 10, which can be set or traversed respectively on complete retraction and extension. Because of the greater play S, for adjustment in the transitional region, a smaller friction force must be overcome than in the comfort regions in the operating region and in the region of the stowage position.

Figure 13:
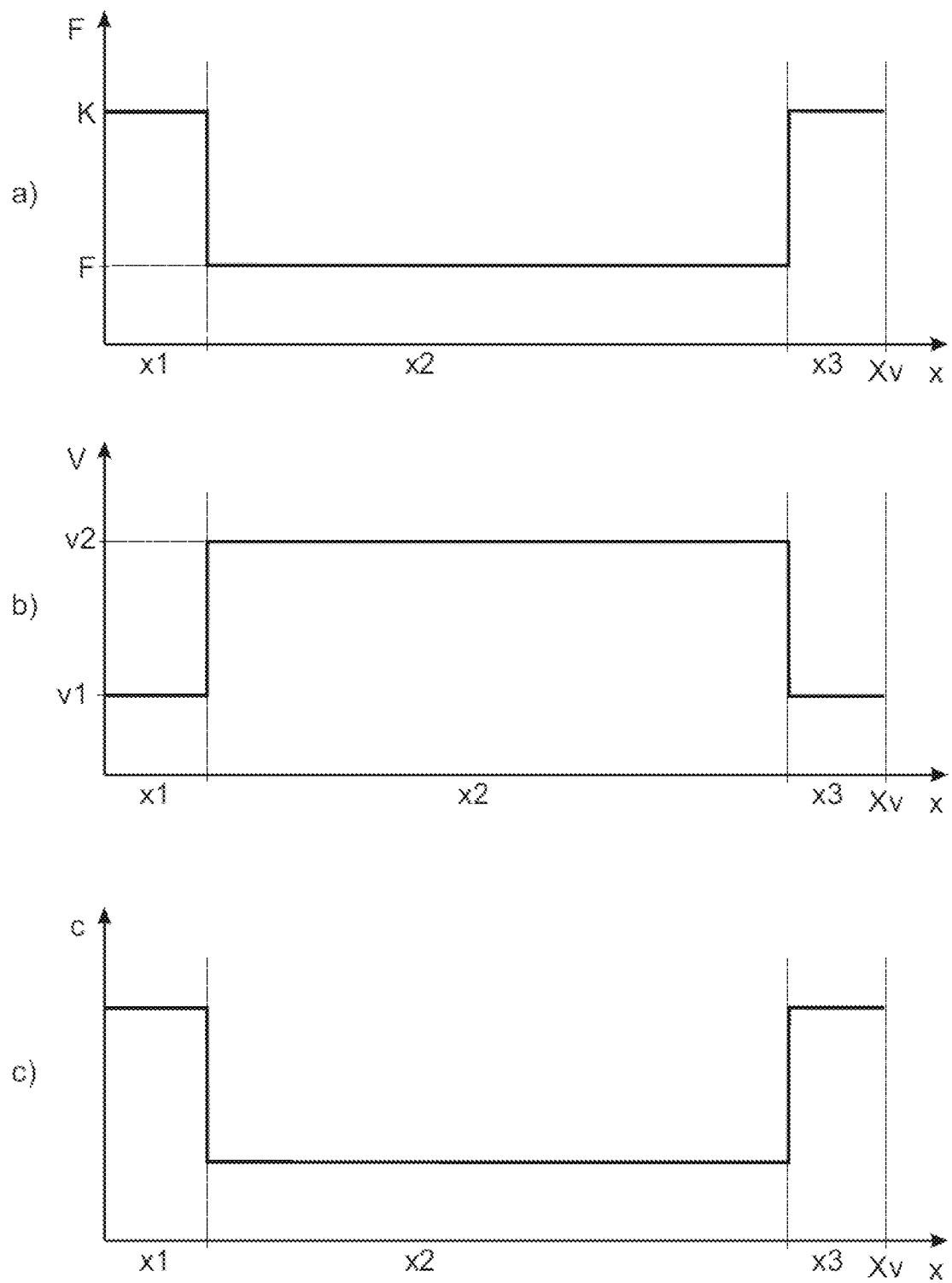
FIG. 13 shows diagrams representing adjustment force-travel, speed-travel, and friction force-travel of a steering column.

FIG. 13 shows a diagram which shows in a) the adjustment force F, in b) the adjustment speed v, and in c) the friction force, in each case over the adjustment travel x (parallel to the longitudinal axis L). Here x1 corresponds to the adjustment in the operating region in the adjustment state shown in FIG. 11, x2 corresponds to the adjustment in the transitional region in the adjustment state shown in FIGS. 10, and x3 corresponds to the adjustment in the comfort region/stowage region of the stowage position Xv in the adjustment state shown in FIG. 9.

It is clearly evident from FIG. 13.a) how the adjustment force necessary for the relative movement of the casing tubes 31, 32 and 33 diminishes, on adjustment between the comfort regions, from the comfort adjustment force K to the lower transitional adjustment force F. As a consequence, an adjustment drive 6 with a specific drive power can achieve a higher adjustment speed in the transitional region, as shown in FIG. 13.b). The friction force c to be overcome for adjustment, as shown in FIG. 13.c), behaves similarly to the adjustment force. The radial and vertical stiffness of the steering column behaves similarly to the friction force shown in FIG. 13.c).

According to the method of the invention, the adjustment drive 6 is actuated so as to execute an adjustment, in the operating region x1, with a first adjustment speed v1 known as the adjustment or positioning speed, wherein a high operating adjustment force K is exerted. In the transitional region x2 adjoining the operating region x1, a faster adjustment takes place with the second adjustment speed v2 or the transitional speed, wherein a lower stowage adjustment force F is exerted.

Figure 14:
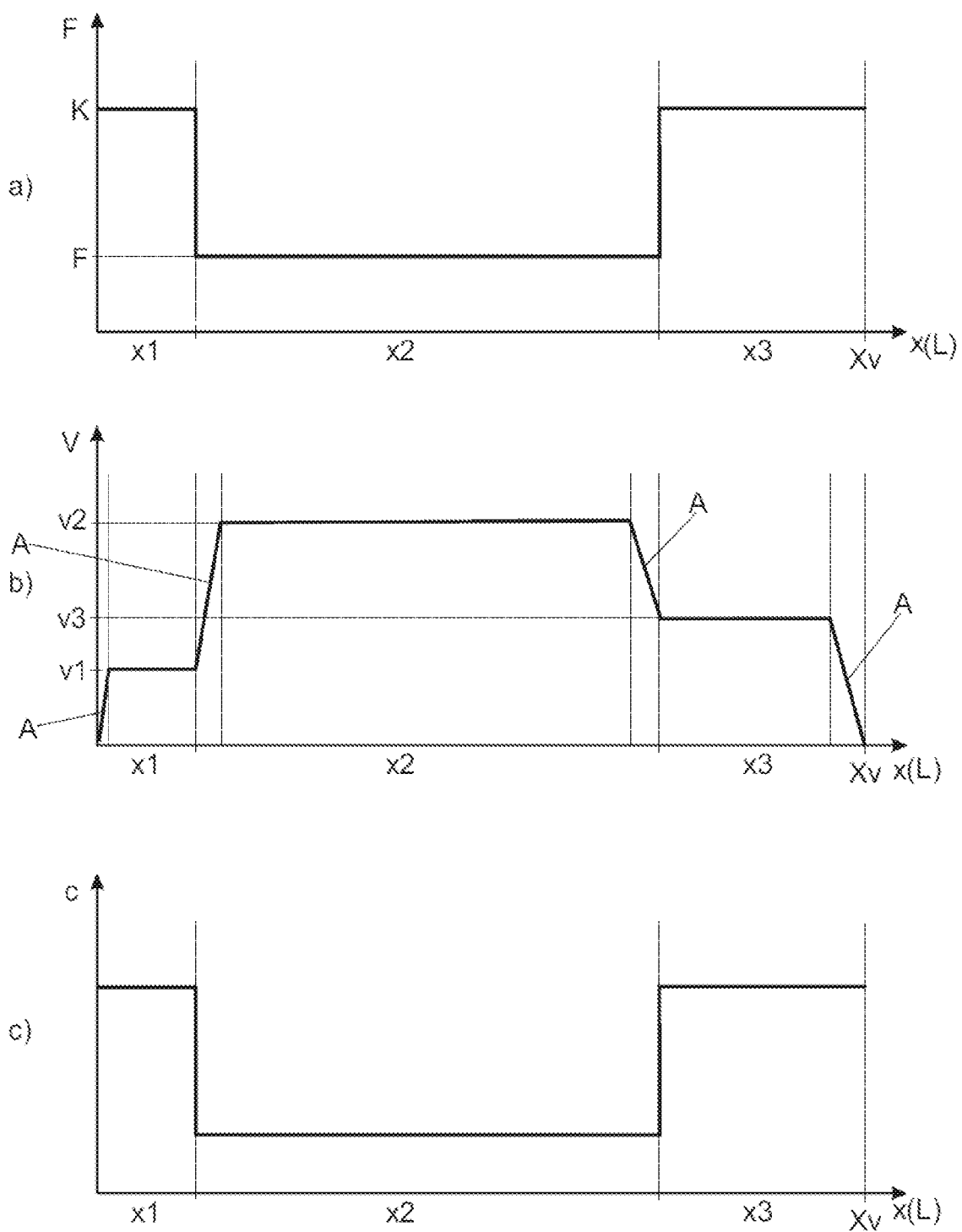
FIG. 14 shows diagrams representing adjustment force-travel and friction force-travel similar to FIG. 13, and a modified speed-travel diagram.

FIG. 14 corresponds to the diagrams of FIG. 13 in the depictions of 14.a) and 14.c). The adjustment in operating region x1 takes place with a third adjustment speed v3, wherein v3=v2 may be the case, or as shown v2>v3>v1.

A difference is that, at both the start and end of the regions x1, x2 and x3, and hence also at the transition between the regions x1, x2 and x3, the adjustment speed is increased between zero and v1, between v1 and v2, between v2 and v3, and reduced between v3 and zero in the acceleration portions A, with constant acceleration. As an alternative to the linear rise and fall in adjustment speed v as shown, progressive and/or degressive change rates may be implemented.

The casing unit 3 may be adjusted in the height direction H by means of a second adjustment drive 60 which forms a height adjustment drive and is shown in FIG. 2, wherein this may be formed as a spindle drive similarly to the adjustment drive 6 and acts on the actuating unit 2 and the carrier unit 5.

Figure 15:
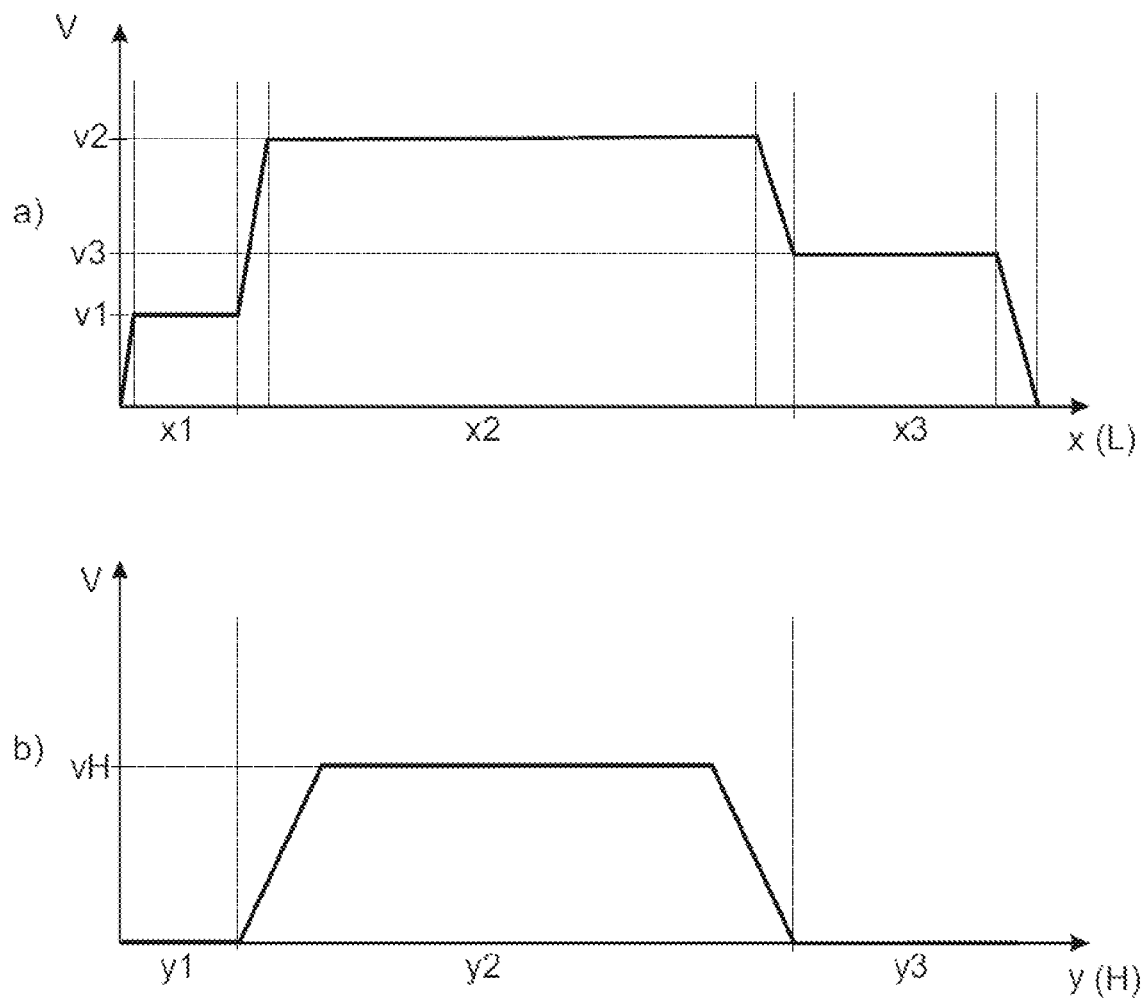
FIG. 15 shows diagrams representing associated speed-travel in longitudinal and height directions.

By means of the adjustment drive 60, a height adjustment may take place in the y direction parallel to the height direction H. In the diagram shown in FIG. 15.b), y3 designates a height position in the stowage position, y2 in the transitional region, and y1 in the operating region. In FIG. 15.a), the x adjustment is given as in FIG. 14.b), and in FIG. 15.b) the corresponding speed-travel diagram of a height adjustment in the y direction (parallel to the height direction H), in which the height adjustment speed is shown over the height position y. It is evident that a height adjustment takes place with a height adjustment speed vH only in the transitional region x2. Thus a combined, fast stowage adjustment takes place simultaneously in the length and height direction only in the transitional region x2 outside the operating region x1.

Evidently, a height adjustment may take place in the operating region also by means of a control command entered by the vehicle driver. The diagrams shown in FIG. 15 show the adjustment speeds of the inner casing tube relative to the outer casing tube or carrier unit during the switch between autonomous and manual driving modes.

Figure 16:
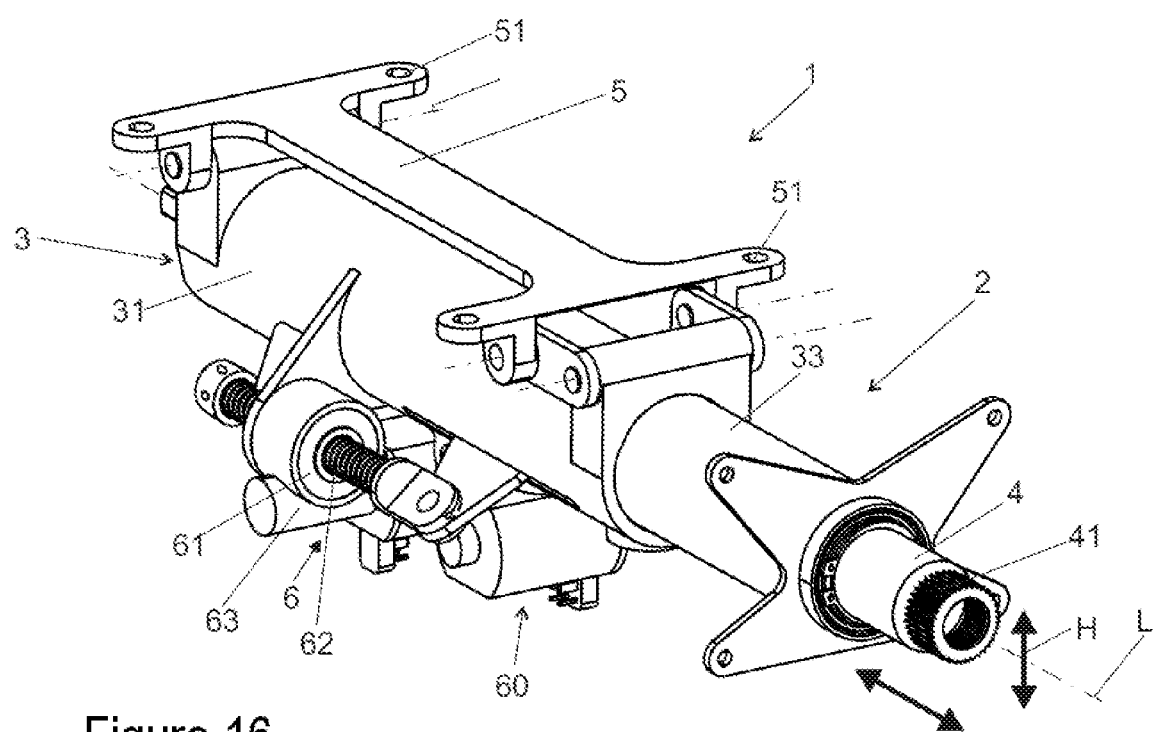
FIG. 16 is a schematic perspective view of a second embodiment of a steering column.

FIG. 16 shows, in a view similar to FIG. 1, a second embodiment of a steering column 1 intended for performance of the method according to the invention, wherein the same reference signs are used for parts of equivalent function.

In contrast to the embodiment of FIG. 1, the telescopic arrangement of the casing unit 3 is formed only by the inner casing tube 33 guided telescopically in the outer casing tube 31. There is no intermediate casing tube 32, but otherwise the function is similar.

Figure 17:
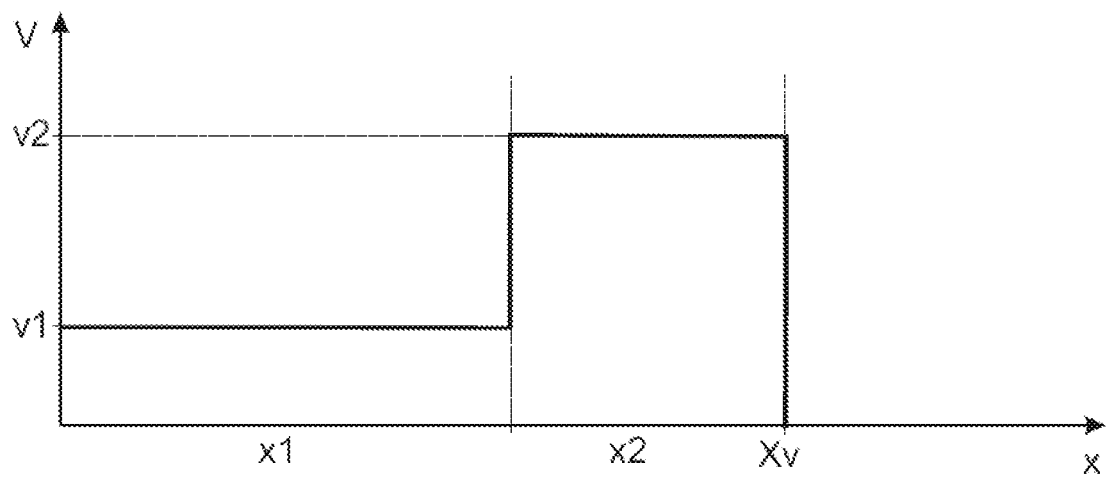
FIG. 17 is a speed-travel diagram during adjustment of the steering column from FIG. 16.
Figure 18:
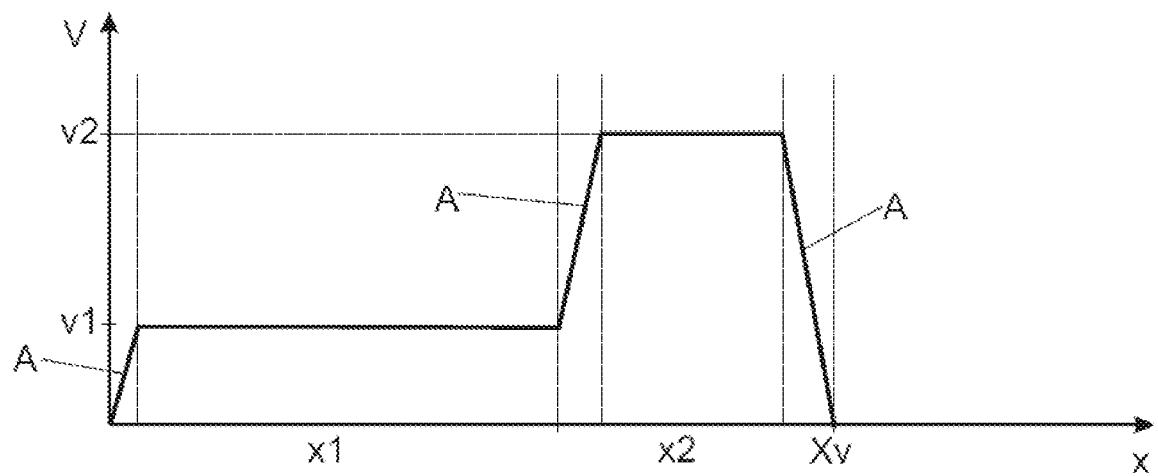
FIG. 18 is a modified speed-travel diagram during adjustment of a steering column similar to that FIG. 16.

FIGS. 17 and 18 show speed-travel diagrams which correspond to the diagrams in FIGS. 13.b) and 14.b). In the transitional region x2, the adjustment takes place with the transitional speed v2 which is higher than the adjustment speed v1 in the operating region x1. The stowage position Xv is arranged at the end of the transitional region x2. In this embodiment, there is no stowage region, or it could be said in other words that the stowage region is formed by the stowage position. As FIG. 18 shows, acceleration portions A may be provided between the different adjustment speeds of zero, v1 and v2, in which the adjustment speed is increased or reduced with constant acceleration. As an alternative to the linear rise and fall of the adjustment speed v shown, also progressive and/or degressive change rates may be implemented.

LIST OF REFERENCE SIGNS

1 Steering column
2 Actuator unit
3 Casing unit
31 Outer casing tube
311 Inner bearing portion of 31
313 Inner bearing portion of 31
312 Inner guide portion of 31
32 Intermediate casing tube
321 Outer bearing portion of 32
322 Outer guide portion of 32
323 Inner guide portion of 32
324 Inner bearing portion of 32
33 Inner casing tube
331 Outer bearing portion of 33
332 Outer guide portion of 33

34, 35 Stop
4 Steering spindle
41 Connecting portion
42 Outer shaft
43 Inner shaft
44 Guide sleeve
5 Carrier unit
51 Fixing means
6 Adjustment drive (length adjustment drive)
60 Height adjustment drive
61 Spindle nut
62 Threaded spindle
63 Motor
7, 8 Rollers
71, 81 Roller axes
92, 93 Sliding sleeves
d1 Inner diameter of 311/outer diameter of 321
d2 Inner diameter of 312
d3 Outer diameter of 322
d4 Inner diameter of 323
d5 Inner diameter of 324/outer diameter of 331
d6 Outer diameter of 332
L Longitudinal axis
S Play
K Operating adjustment force (comfort adjustment force)
F Stowage adjustment force (transitional adjustment force)
C Friction force
x1 Operating region
x2 Transitional region
x3 Stowage region
v1 First adjustment speed
v2 Second adjustment speed
v3 Third adjustment speed
vH Height adjustment speed

The invention claimed is:

1. A method for adjusting a steering column for a motor vehicle that includes a casing unit in which a steering spindle is mounted rotatably about a longitudinal axis and at least two casing tubes that are guided so as to be adjustable relative to one another by an adjustment travel in a longitudinal direction of the longitudinal axis, wherein along the adjustment travel the at least two casing tubes are extended farther out of one another in an operating region than in a transitional region, the method comprising:
electrically actuating a motorized adjustment drive acting on the at least two casing tubes for relative adjustment of the casing tubes at a predetermined adjustment speed, wherein a first adjustment speed is set in the operating region and a second adjustment speed is set in the transitional region, with the second adjustment speed being higher than the first adjustment speed,
wherein the adjustment drive exerts a higher adjustment force at a lower adjustment speed than at a higher adjustment speed.

2. The method of claim 1 wherein the predetermined adjustment speed changes linearly.

3. The method of claim 1 wherein the predetermined adjustment speed changes non-linearly.

4. The method of claim 1 comprising detecting a relative position of the at least two casing tubes with a position sensor.

5. The method of claim 1 wherein the steering column includes a motorized height adjustment drive disposed between the casing unit and a carrier unit that is positionable on a body of the motor vehicle, wherein the motorized adjustment drive is electrically actuatable for relative height adjustment of the casing unit transversely to the longitudinal axis with a predefined height adjustment speed.

6. The method of claim 5 wherein the relative height adjustment occurs at least partially simultaneously with the adjustment travel in the direction of the longitudinal axis.

7. The method of claim 5 wherein the relative height adjustment occurs in the transitional region.

8. A method for adjusting a steering column for a motor vehicle that includes a casing unit in which a steering spindle is mounted rotatably about a longitudinal axis and at least two casing tubes that are guided so as to be adjustable relative to one another by an adjustment travel in a longitudinal direction of the longitudinal axis, wherein along the adjustment travel the at least two casing tubes are extended farther out of one another in an operating region than in a transitional region, the method comprising:
electrically actuating a motorized adjustment drive acting on the at least two casing tubes for relative adjustment of the casing tubes at a predetermined adjustment speed, wherein a first adjustment speed is set in the operating region and a second adjustment speed is set in the transitional region, with the second adjustment speed being higher than the first adjustment speed,
wherein the at least two casing tubes are movable relative to one another at least partially with a smaller adjustment force in the transitional region than in the operating region.

9. The method of claim 8 wherein the predetermined adjustment speed changes linearly.

10. The method of claim 8 wherein the predetermined adjustment speed changes non-linearly.

11. The method of claim 8 comprising detecting a relative position of the at least two casing tubes with a position sensor.

12. The method of claim 8 wherein the steering column includes a motorized height adjustment drive disposed between the casing unit and a carrier unit that is positionable on a body of the motor vehicle, wherein the motorized adjustment drive is electrically actuatable for relative height adjustment of the casing unit transversely to the longitudinal axis with a predefined height adjustment speed.

13. The method of claim 12 wherein the relative height adjustment occurs at least partially simultaneously with the adjustment travel in the direction of the longitudinal axis.

14. The method of claim 12 wherein the relative height adjustment occurs in the transitional region.

15. A method for adjusting a steering column for a motor vehicle that includes a casing unit in which a steering spindle is mounted rotatably about a longitudinal axis and at least two casing tubes that are guided so as to be adjustable relative to one another by an adjustment travel in a longitudinal direction of the longitudinal axis, wherein along the adjustment travel the at least two casing tubes are extended farther out of one another in an operating region than in a transitional region, the method comprising:
electrically actuating a motorized adjustment drive acting on the at least two casing tubes for relative adjustment of the casing tubes at a predetermined adjustment speed, wherein a first adjustment speed is set in the operating region and a second adjustment speed is set in the transitional region, with the second adjustment speed being higher than the first adjustment speed,
wherein the at least two casing tubes are retracted farther into one another in a stowage region than in the transitional region, wherein a third adjustment speed is set in the stowage region, with the third adjustment speed being lower than the second adjustment speed, wherein the at least two casing tubes are movable relative to one another at least partially with a smaller adjustment force in the transitional region than in the stowage region.

16. The method of claim 15 wherein the predetermined adjustment speed changes linearly.

17. The method of claim 15 wherein the predetermined adjustment speed changes non-linearly.

18. The method of claim 15 comprising detecting a relative position of the at least two casing tubes with a position sensor.

19. The method of claim 15 wherein the steering column includes a motorized height adjustment drive disposed between the casing unit and a carrier unit that is positionable on a body of the motor vehicle, wherein the motorized adjustment drive is electrically actuatable for relative height adjustment of the casing unit transversely to the longitudinal axis with a predefined height adjustment speed.

20. The method of claim 19 wherein the relative height adjustment occurs at least partially simultaneously with the adjustment travel in the direction of the longitudinal axis.

* * * * *